US012756059B2

(12) United States Patent
Konzelmann et al.

(10) Patent No.: US 12,756,059 B2
(45) Date of Patent: Oct. 6, 2026

(54) EMERGENCY DEGASSING DEVICE

(71) Applicant: BODO KONZELMANN KG, Löchgau (DE)

(72) Inventors: André Konzelmann, Bietigheim-Bissingen (DE); Volker Buchmann, Rutesheim (DE)

(73) Assignee: BODO KONZELMANN KG, Löchgau (DE)

( * ) Notice: Subject to any disclaimer, the term of this patent is extended or adjusted under 35 U.S.C. 154(b) by 595 days.

(21) Appl. No.: 18/257,026

(22) PCT Filed: Dec. 21, 2021

(86) PCT No.: PCT/EP2021/087121
§ 371 (c)(1),
(2) Date: Jun. 12, 2023

(87) PCT Pub. No.: WO2022/136451
PCT Pub. Date: Jun. 30, 2022

(65) Prior Publication Data

US 2024/0047816 A1 Feb. 8, 2024

(30) Foreign Application Priority Data

Dec. 22, 2020 (DE) ..................... 10 2020 134 548.8

(51) Int. Cl.
*H01M 50/342* (2021.01)
*H01M 50/325* (2021.01)
*H01M 50/333* (2021.01)

(52) U.S. Cl.
CPC ..... *H01M 50/3425* (2021.01); *H01M 50/325* (2021.01); *H01M 50/333* (2021.01); *H01M 2200/20* (2013.01)

(58) Field of Classification Search
CPC ............ H01M 50/325; H01M 50/333; H01M 50/3425
See application file for complete search history.

(56) References Cited

U.S. PATENT DOCUMENTS 5,741,606 A * 4/1998 Mayer ................ H01M 50/578 429/57
10,439,184 B2 * 10/2019 Matsuura .......... H01M 50/3425
(Continued)

FOREIGN PATENT DOCUMENTS

CN 209434272 U 9/2019
CN 111341969 A 6/2020
(Continued)

OTHER PUBLICATIONS

Machine translation WO 2020138254.*
(Continued)

*Primary Examiner* — Kevin F Murphy
(74) *Attorney, Agent, or Firm* — Lucian Wayne Beavers; Patterson Intellectual Property Law, PC

(57) ABSTRACT

The invention relates to an emergency degassing device (10) for equalizing an internal pressure in a receiving housing of an electrochemical or electrical device, in particular for a battery housing, having a housing (20) which has at least one gas passage opening (27.2), wherein the gas passage opening (27.2) is blocked by means of a gas-tight, in particular air-tight, membrane (30) which is accommodated in or on a membrane mount (27) in the housing (20), wherein a cutting element (27.3) is disposed at a distance from the gas-tight membrane (30), which cutting element (27.3) is designed and positioned in such a way that, in the event of a predetermined deformation of the gas-tight membrane (30), it hits the cutting element (27.3) and the gas-tight membrane (30) at least at one location to create a flow connection between an interior (21.2) of the emergency degassing
(Continued)

Figure 1:
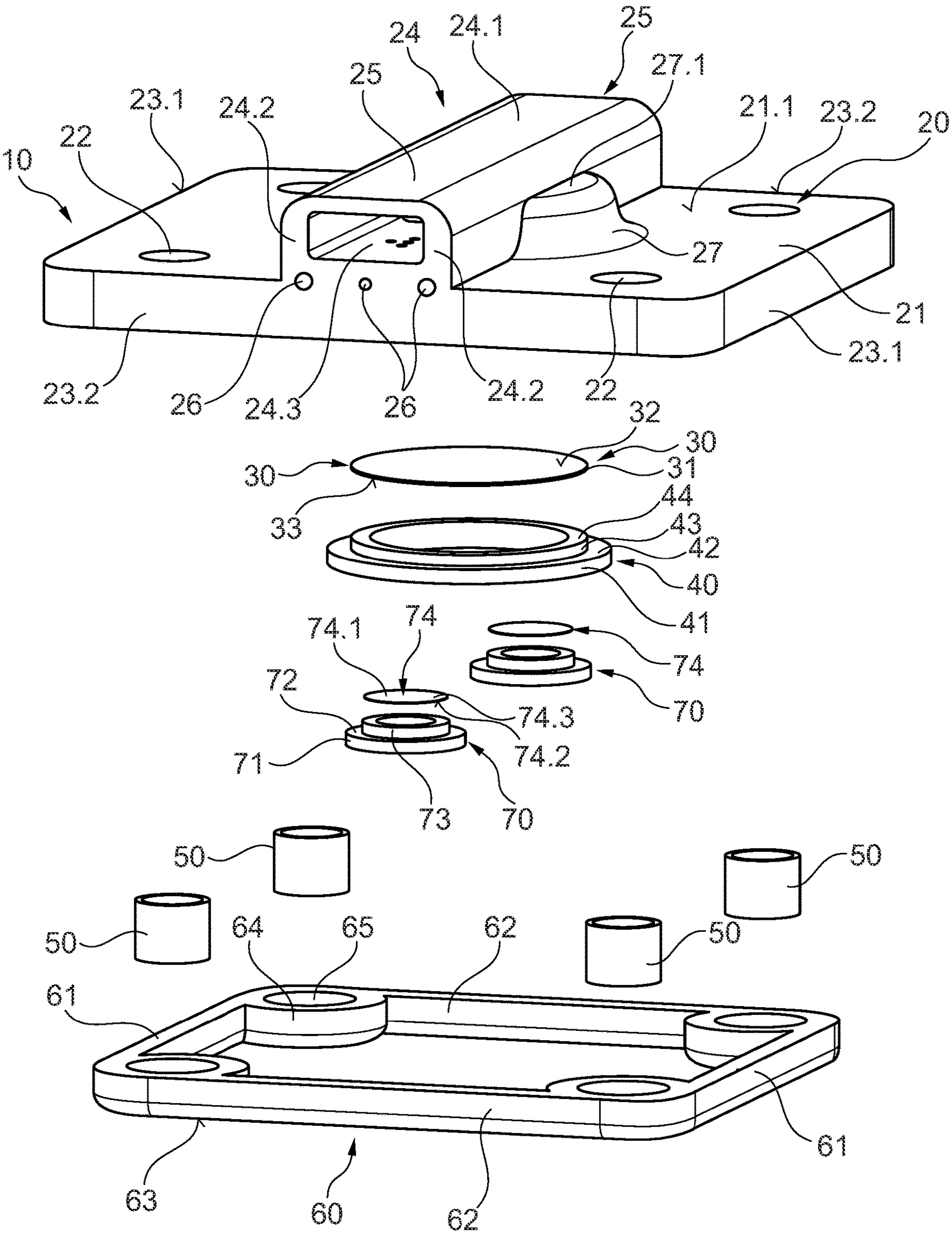

device (10) and an exterior (21.1) of the emergency degassing device (10) through the gas passage opening (27.2). For improved moisture protection of the receiving housing, provision is made in accordance with the invention for at least one mount (29) to be provided in or on the housing (20), to which at least one air passage (29.2) is assigned between the interior (21.2) and the exterior (21.1), wherein the air passage(s) (29.2) is/are covered by means of at least one venting element (74) in the form of a gas-permeable membrane.

15 Claims, 6 Drawing Sheets

(56) References Cited

U.S. PATENT DOCUMENTS

| | | | | |
|---|---|---|---|---|
| 10,529,969 | B2 * | 1/2020 | Ogawa ................ | F16K 17/0493 |
| 10,811,650 | B2 * | 10/2020 | Wakimoto .......... | H01M 50/553 |
| 11,962,031 | B2 | 4/2024 | Waha et al. | |
| 2013/0032219 | A1 | 2/2013 | Heim et al. | |
| 2020/0280030 | A1 | 9/2020 | Waha et al. | |
| 2021/0320375 | A1 | 10/2021 | Zbiral et al. | |

FOREIGN PATENT DOCUMENTS

| | | | | | |
|---|---|---|---|---|---|
| DE | 102011080325 | A1 | | 2/2013 | |
| DE | 102013207872 | A1 | * | 10/2014 | .......... H01M 50/224 |
| DE | 102013215552 | A1 | | 2/2015 | |
| DE | 202015005264 | U1 | | 5/2016 | |
| DE | 202020101150 | U1 | | 4/2020 | |
| DE | 102019100094 | A1 | | 7/2020 | |
| JP | 2015170471 | A | | 9/2015 | |
| KR | 1020190049452 | A | | 5/2019 | |
| WO | WO-2020138254 | A1 | * | 7/2020 | ............ H01M 50/35 |

OTHER PUBLICATIONS

Machine translation DE 102013207872.*

Japanese Office Action for corresponding patent application No. 2023-561921, dated Sep. 2, 2025, 12 pages including English translation (not prior art).

Korean Office Action for corresponding patent application No. 10-2023-7024418, dated Aug. 20, 2025, 19 pages (not prior art).

International Search Report for corresponding patent application No. PCT/EP2021/087121, dated Apr. 14, 2022, 12 pages (not prior art).

Search Report for corresponding patent application No. DE 10 2020 134 548.8, dated Sep. 6, 2021, 10 pages (not prior art).

* cited by examiner

EMERGENCY DEGASSING DEVICE

The invention relates to an emergency degassing device for equalizing an internal pressure in a receiving housing of an electrochemical or electrical device, in particular for a battery housing, having a housing, which comprises at least one gas passage opening, wherein the gas passage opening is closed off by means of a gas-tight, in particular air-tight, membrane, which is accommodated in or on a membrane mount in the housing, wherein a cutting element is assigned to the gas-tight membrane, wherein in particular the cutting element is disposed at a distance from the membrane, wherein the cutting element is designed and positioned in such a way that, in the event of a predetermined deformation of the gas-tight membrane, it strikes the cutting element and destroys this gas-tight membrane at least at one point to create a flow connection between an inside of the emergency degassing device and an exterior of the emergency degassing device via the gas passage opening.

Such an emergency degassing device system is known from DE 10 2011 080 325 A1. This known emergency degassing device features a support element having a flange section with bores for attachment to a battery housing. In so doing, the support element covers the rim of an aperture in the battery housing. The support element is connected to a membrane that blocks a gas passage opening of the support element. The membrane is stretched between the support element and a clamping piece and is held in a circumferentially sealed manner. Further, a housing-like protective element is used, which comprises a cutting element in a central area. This cutting element is opposite from the membrane. The protective element is used to prevent access to the membrane from the exterior of the emergency degassing device. The protective element has gas passage openings. The membrane is gas permeable but essentially water repellent. The water-repellent function is such that water from the environment cannot reach the inside from the exterior, or only to an insignificant extent. During normal operation, the membrane can provide the gas equalization between the environment and the battery housing. This is possible because the membrane is permeable to gas. If an abrupt burst pressure now occurs, for instance due to a fault in the battery housing, the membrane bulges outward. A distance is provided between the cutting element and the exterior of the membrane, which determines the permissible deformation of the membrane in such a damage event. If the membrane bulges beyond the permissible deformation, it contacts the cutting element, which is designed as a tip. The cutting element damages the membrane, causing it to tear. The gas can then quickly escape from the battery housing through the gas passage opening into the environment. This prevents the battery case from exploding.

As this was explained above, the membrane "breathes" during "normal" operating conditions. This involves an exchange of air between the environment and the interior of the battery housing through the gas-permeable membrane. The air entering the battery housing carries moisture along. It condenses in the battery housing, which is perceived as a disadvantage.

The emergency degassing device known from the prior art also has a complex design. Owing to the inevitable dimensional tolerances that occur between the individual components of the device as a result of the manufacturing process, it cannot be ensured that the cutting element is always at exactly the same distance from the surface of the membrane in different emergency degassing fixtures of one batch. This results in varying and non-reproducible bursting behaviors of the membrane.

The invention addresses the problem of providing an emergency degassing device of the type mentioned above, which can be used to at least significantly reduce or prevent the problem of penetrating air humidity.

This problem is solved in that in or on the housing there is at least one mount, to which at least one air passage is assigned between the interior and the exterior, wherein the air passage or passages are blocked by means of at least one venting element in the form of a gas-permeable membrane.

According to the invention, the bursting function is therefore separate from the breathing function. To be able to abruptly reduce the internal pressure in the receiving housing of the electrochemical or electrical device in the event of damage, the gas-tight membrane has to provide a sufficiently large free cross-sectional area. This is then exposed in the event of damage such that the pressure can be relieved. During normal operating conditions, no air humidity can enter the receiving housing via the gas-tight membrane. However, in order to allow pressure equalization to occur between the interior of the receiving housing and the environment under these normal operating conditions, the at least one venting element is used. This is formed in a structurally simple manner by a gas-permeable membrane. The gas-permeable membrane is gas-permeable but waterproof. Accordingly, this gas-permeable membrane prevents water from entering from the exterior, but enables breathing. While the bursting function requires a large free cross-sectional area of the gas-tight membrane, the breathing function of the gas-permeable membrane (venting element) requires only a small cross-sectional area. This means that the venting elements can be individually and specifically designed for the breathing function on the one hand and the gas-tight membrane responsible for the bursting function can be individually and specifically designed on the other hand, wherein less air moisture penetrates into the receiving housing preferably via the venting elements on a small cross-section. In this way, the design of the bursting function and breathing function can thus be performed independently of each other.

According to a preferred variant of the invention, provision may be made for the cutting element to be supported by a holder of the housing, and for the housing to form a component, to which the holder for the cutting element and an attachment section of the membrane mount are integrally interconnected, wherein the gas-tight membrane is directly or indirectly connected to the attachment section in a sealed manner. The integral connection of the holder to the attachment section ensures that the cutting element is always dimensionally accurately assigned to the attachment section and thus also to the gas-tight membrane. In this way, reproducible bursting behavior can be set. In addition, the emergency degassing device according to the invention has a particularly simple and robust design. As a result, it operates reliably and also requires fewer parts and less assembly.

According to a preferred embodiment of the invention, provision may be made for the support to form the at least one gas passage opening, wherein preferably provision may be made for a bar section of the holder to be formed between at least two gas passage openings, on which holder the cutting element is disposed. It has been shown that in the event of an incident these designs can result in an effective gas dissipation. In addition, the support also covers the gas-tight membrane, at least in the areas where it does not have a gas aperture, and thus provides mechanical protection, for instance against access, splash water and permanent flooding.

Preferably, provision may also be made for a spacer to be integrally molded to the holder to hold the attachment section at a distance from the holder. In this way, the distance between the gas-tight membrane and the cutting element can be manufactured to fit precisely.

According to a variant of the invention, the emergency degassing device can be designed having a low overall height based on the membrane mount having a mount that is recessed in a wall of the housing facing the interior, wherein the attachment section is disposed in the mount at a distance from the wall in the direction towards the exterior.

A particularly preferred variant of the invention is characterized in that a gas guide is disposed in the area of the exterior of the housing, which gas guide creates a spatial connection between the gas passage opening(s) and/or the at least one passage and the environment adjoining the exterior, and wherein the gas guide comprises at least one wall element, which covers the at least one gas passage opening and/or the at least one passage in the area of the exterior. The gas can be discharged in case of overload and/or in normal operation via the gas duct. In this regard, the gas guide may be designed such that the wall element of the gas guide provides mechanical access protection that prevents direct access to the gas-tight membrane and/or the at least one venting element.

In this case, provision may also be made for the gas guide to comprise at least one gas guide channel, wherein the gas guide channel or channels are delimited by the at least one wall element and laterally by connection sections, and for the at least one wall element to be integrally connected to the housing via one or more of the connection sections. This design additionally improves the mechanical access protection based on the lateral connection sections. The integral connection further reduces the number of parts and the assembly costs. In particular, no further component is then required to form the gas guide channel.

One conceivable design of the invention may be such that the gas guide comprises at least one gas outlet opening providing a gas-conducting connection between the gas guide and the environment in the area of the exterior, and that the gas outlet opening is disposed at a distance from the one or more gas passage openings and/or the at least one passage. The spacing not only provides protection against access. Rather, it also ensures that splash water entering from the exterior cannot easily reach and damage the gas-tight membrane and/or the venting elements. Preferably, for this purpose, the distance between the gas outlet opening and the gas passage opening(s) and/or the at least one passage is at least twice that of the minimum cross-sectional diameter of the gas passage opening and/or the at least one passage.

Access protection and also splash water protection are achieved particularly effectively when provision is made for preventing a straight line of sight between the gas outlet opening and the gas passage opening and/or the at least one passage. This prevents linear objects, such as a wire or screwdriver, inserted through the gas outlet opening from striking the membrane and/or the venting element.

If provision is made for the cross-sectional area of the gas outlet opening or the sum of the cross-sectional areas of the gas outlet openings to be equal to or greater than the cross-sectional area of the gas passage opening or openings, then any adverse acceleration of the gas flow in the event of damage is prevented.

One conceivable variant of the invention is such that the housing comprises a cover, which is integrally molded and is provided with attachment elements, preferably attachment mounts, which can be formed in particular as bores, wherein the attachment elements are formed and disposed in order to connect the emergency degassing device to a housing wall of the receiving housing, in particular of the battery housing.

Preferably, the housing is made of plastic and, in particular, is preferably integrally formed as an injection-molded plastic part.

In such a design, provision may be made in particular for the attachment mounts to receive sleeves, which are made of a metal or plastic material, wherein the sleeves are connected to the cover in a form-fitting manner and/or adhesively bonded thereto and form through-openings for screw elements, and for the sleeves to form a bearing surface in the area of the exterior for supporting the screw element. This ensures the permanent connection of the emergency degassing device to the receiving housing, in particular the battery housing.

If provision is made for the housing to comprise a cover, the interior of which forms a seal mount, wherein a circumferential seal with sealing sections is held in or on the seal mount, and for the seal having the sealing sections to form a circumferential sealing surface for the sealed contact with the exterior of the receiving housing, in particular the battery housing, then a robust coupling of the housing to the receiving housing becomes possible.

The gasket can be designed as a separate gasket that is inserted into the seal mount. It is also conceivable that the seal is molded onto the housing using a 2-component injection molding process. Furthermore, it is conceivable that the seal is formed into the seal mount.

If, according to a variant of the invention, provision is made for the gas-tight membrane to comprise a circumferential connection section, which is used to circumferentially connect it in a gas-tight manner directly to the attachment section of the membrane mount and/or for the venting element to comprise a circumferential connection section, which is used to preferably connect it in a gas-tight manner directly to the attachment section of the mount in a circumferential manner, then the number of parts required for the emergency degassing device is considerably reduced.

Alternatively, however, provision may also be made for the gas-tight membrane to be connected to a membrane support of a support, wherein the support comprises an annular circumferential attachment surface, wherein the circumferential connection section of the gas-tight membrane is circumferentially connected to the attachment surface in a gas-tight manner, and that the support comprises a connection surface at a coupling piece, by means of which it is connected to the housing, preferably connected by an adhesive bond, in particular glued or welded, and/or in for the venting element to be connected to a support element of a holder, wherein the support element has an annular circumferential attachment surface, wherein the circumferential connection section of the venting element is preferably circumferentially connected to the attachment surface in a gas-tight manner, and for the holder to comprise, on a connection piece, a connection surface, which is used to connect, preferably adhesively bond, in particular bond, weld or back-injection mold, it to the housing.

According to a particularly preferred variant of the invention, provision may be made for the sum of the free cross-sectional areas of the venting elements or the free cross-sectional area of the one venting element to be smaller than the free cross-sectional area of the gas-tight membrane, wherein preferably provision is made for the sum of the free cross-sectional areas of the venting elements or the free cross-sectional area of the one venting element to be smaller than the free cross-sectional area of the gas-tight membrane.

Figure 2:
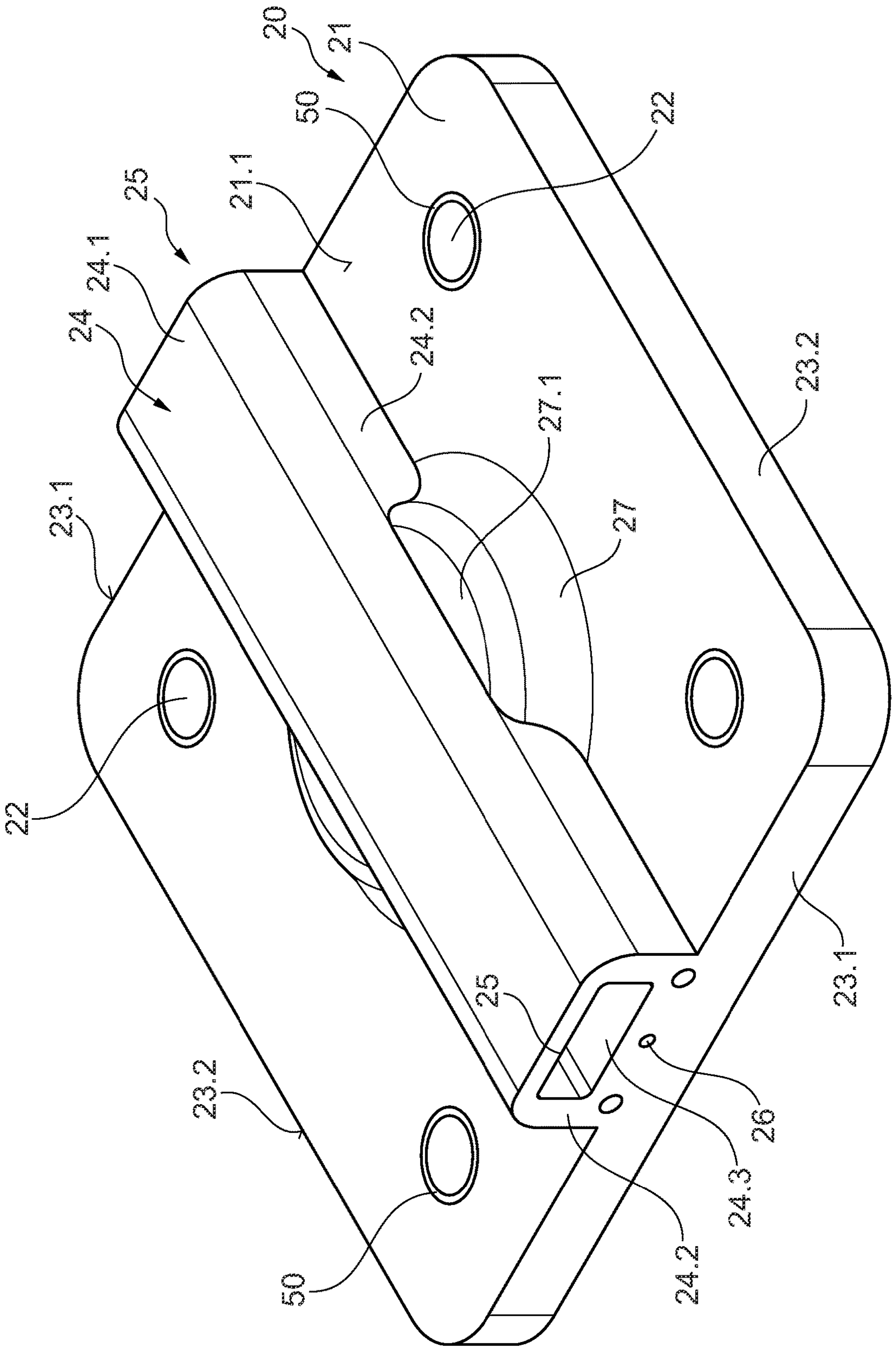
Figure 3:
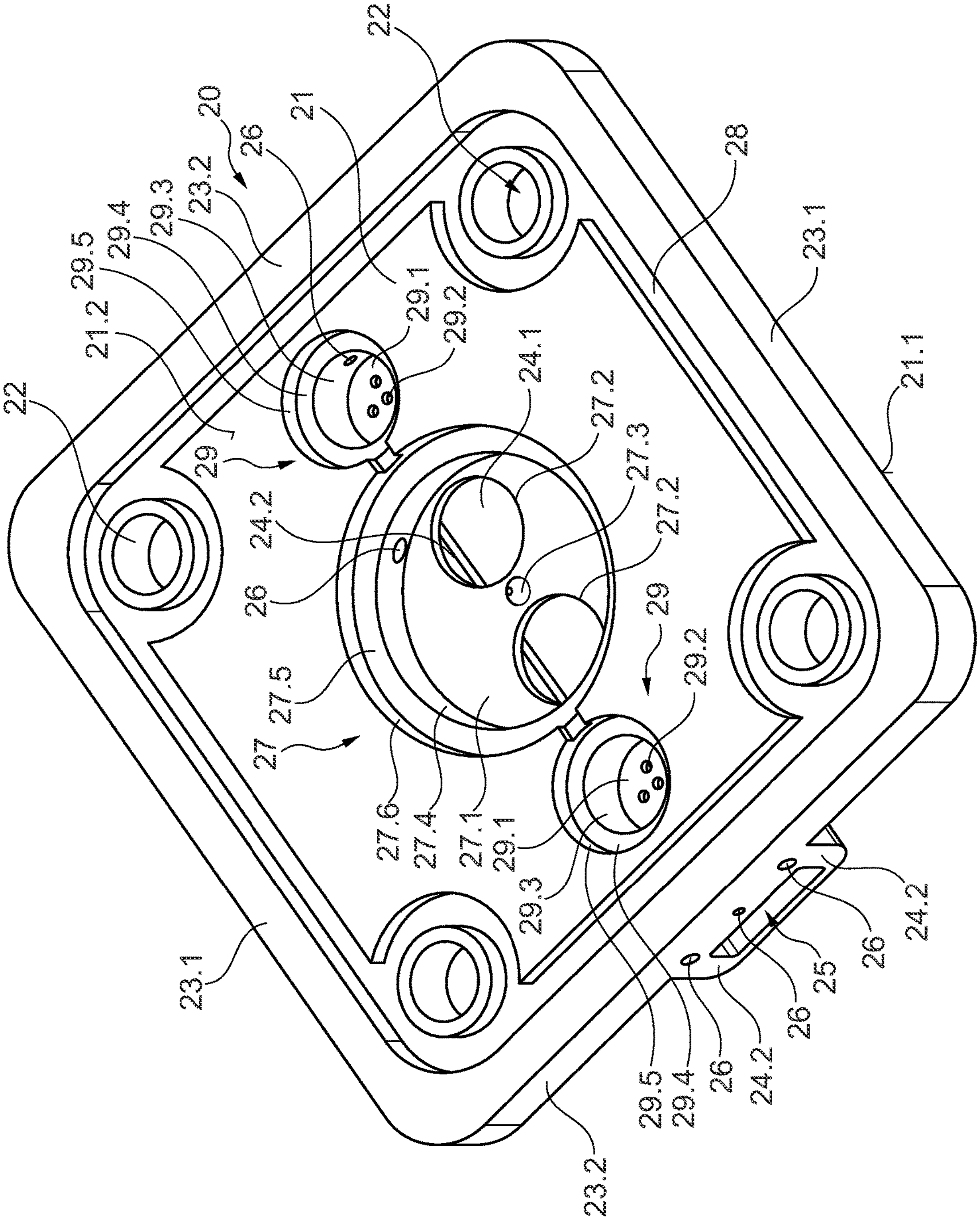
Figure 4:
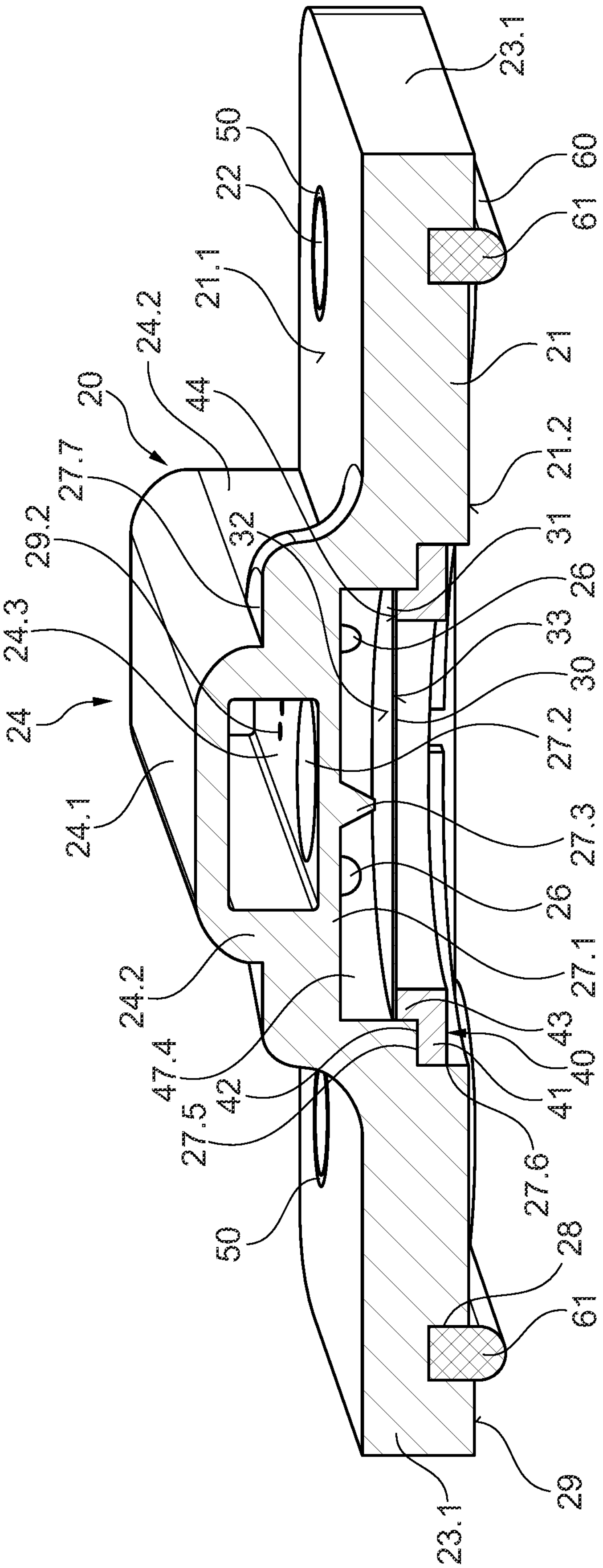
Figure 5:
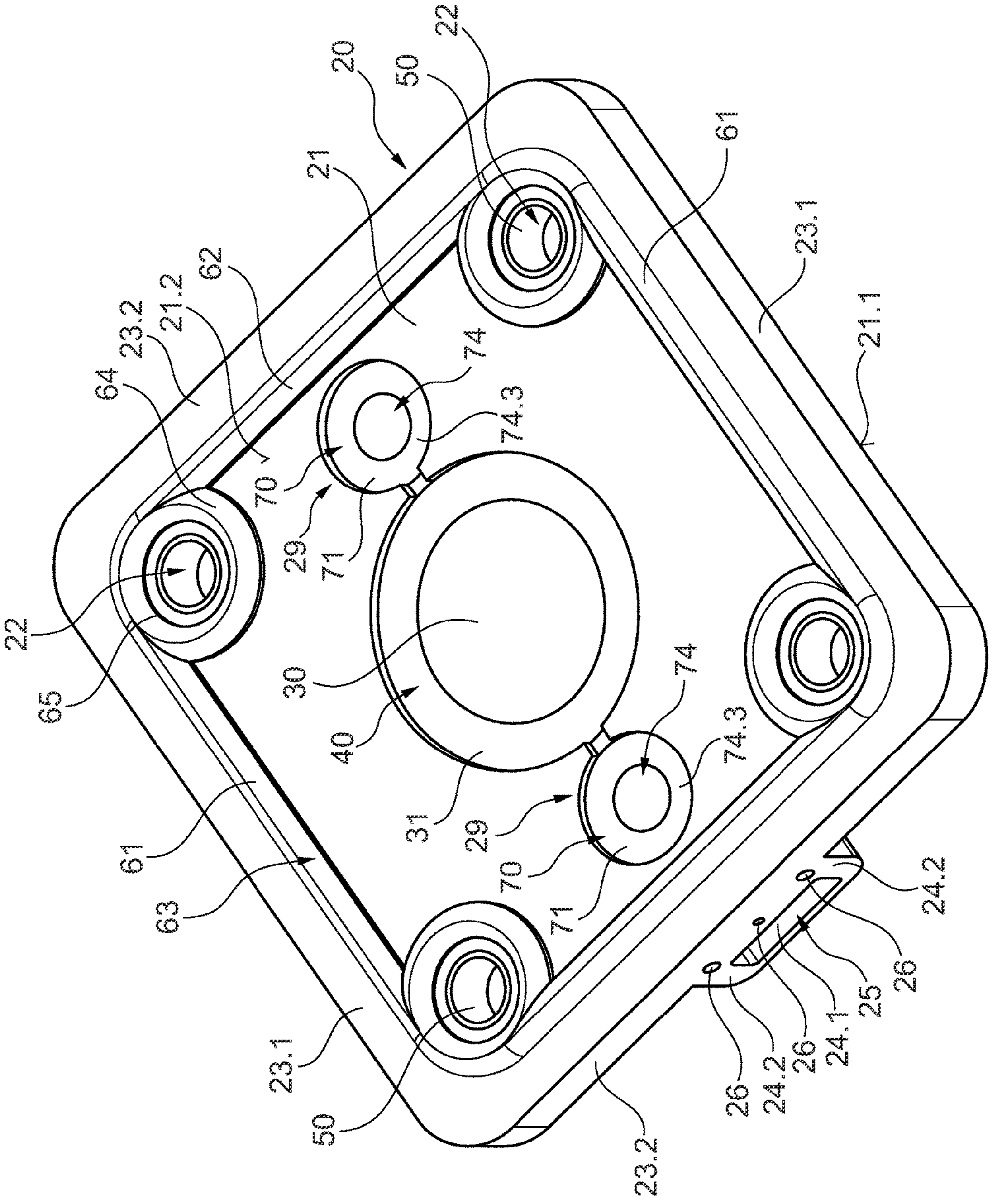
Figure 6:
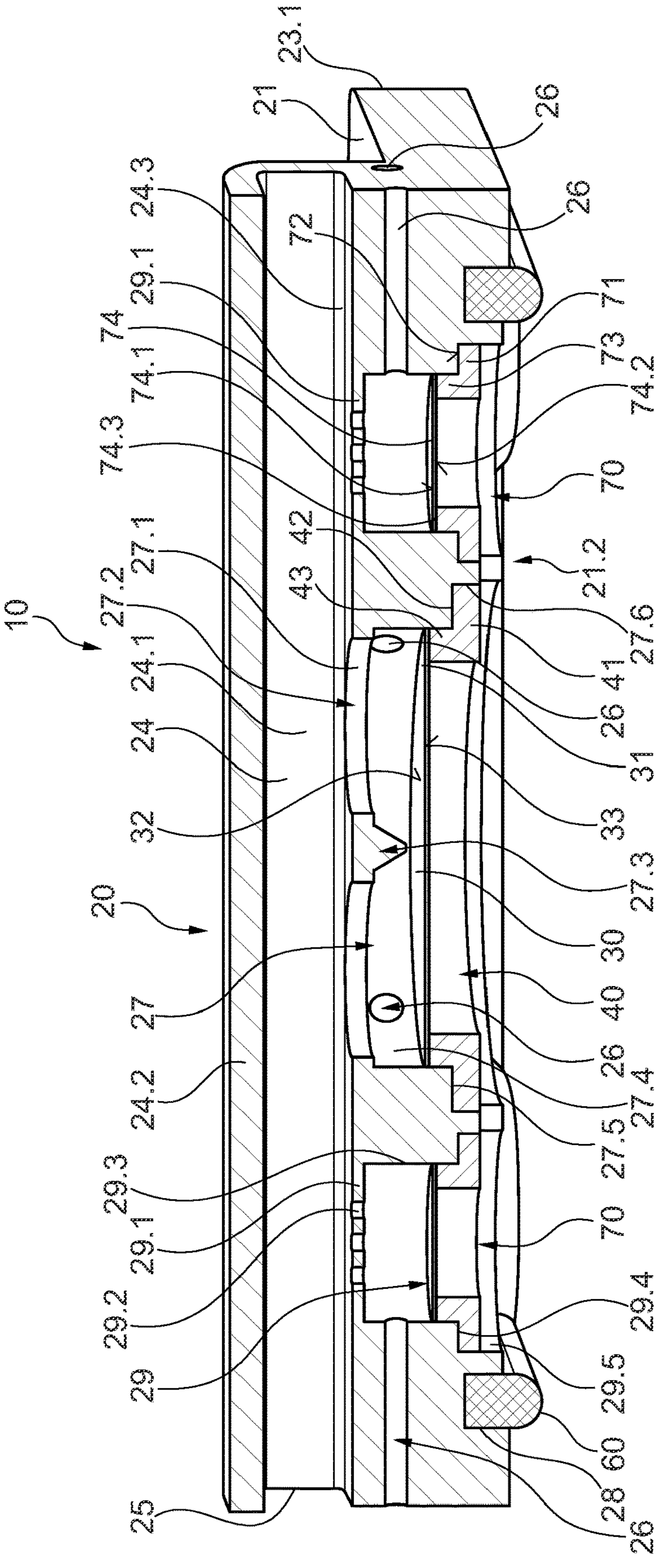

The invention is explained in greater detail below based on exemplary embodiments shown in the drawings. In the figures, FIG. 1 shows a perspective exploded view of an emergency degassing device, FIG. 2 shows a perspective top view of the emergency degassing device of FIG. 1, FIG. 3 shows a structural unit of the emergency degassing device of FIGS. 1 and 2, FIG. 4 shows a longitudinal section of the emergency degassing device of FIGS. 1 and 2, FIG. 5 shows a bottom view of the emergency degassing device of FIGS. 1 and 2, and FIG. 6 shows a cross-section of the emergency degassing device of FIGS. 1 and 5.

FIG. 1 shows an emergency degassing device 10, which comprises a housing 20. Preferably, the housing 20 is integrally formed and is injection molded as a plastic part.

The housing 20 has a cover 21, which may be designed like a plate. The cover 21 forms an exterior 21.1 and an interior 21.2 (see FIG. 3). In the assembled state, the exterior 21.1 faces the environment. The interior 21.2 faces a receiving housing, on which the emergency degassing device 10 can be mounted, for instance on a battery housing.

The cover 21 may be provided with attachment mounts 22, which may in particular be formed as bores. The bores 22 penetrate the cover 21 between the exterior 21.1 and the interior 21.2.

As FIG. 1 indicates, the housing 20 is mainly rectangular or square in shape and is delimited by lateral faces 23.1 and end faces 23.2, which are each parallel to the other in pairs. Of course, it is also possible to provide a different contour of the cover 21, for instance a round or oval or polygonal arbitrary contour.

FIG. 3 shows that the housing 20 comprises an integrally molded membrane mount 27. A holder 27.1 is disposed in the area of the membrane mount 27. The holder 27.1 is designed as a plane element and is equipped with at least one gas passage opening 27.2. However, it is also conceivable that only one gas passage opening 27.2 or also several gas passage openings 27.2 are provided on the holder 27.1. The holder 27.1 bears a cutting element 27.3. In this exemplary embodiment, the cutting element 27.3 is disposed on a bar between two gas passage openings 27.2.

Other arrangements of the cutting element 27.3 are conceivable. The cutting element 27.3 is designed as a point-shaped tip. It is also conceivable to use cutting elements 27.3 having linear or differently shaped cutting edges.

A spacer 27.4 integrally adjoins the holder 27.1. In particular, the spacer 27.4 can be designed as circumferential wall.

In the membrane mount 27 the spacer 27.4 merges into an attachment section 27.5. The attachment section 27.5 can be designed as an annular bearing surface, like in this exemplary embodiment. Attachment section 27.5 may also be referred to as attachment surface 27.5. In particular, it is advantageous if the attachment section 27.5 is designed to be circumferential without interruption. The membrane mount 27 also comprises a mount 27.6. It is recessed into a wall of the housing 20, which forms the interior 21.2.

As FIG. 3 further indicates, provision may be made for a drainage 26 to be molded into the cover 21 in the area behind the attachment section 27.5. The drainage 26 may be formed by bores, for instance, as FIG. 3 shows. These bores open into the area of the exterior and extend, for instance, from the spacer 27.4 to a lateral face 23.1 or an end face 23.2, as FIG. 3 shows.

FIGS. 2 and 3 show the gas guide 24 covering the gas passage openings 27.2 on the outside. For this purpose, a wall element 24.1 is used, which is axially spaced apart from the gas passage openings 27.2 and is integrally connected to the housing 20, in particular the cover 21, on the outside via lateral connection sections 24.2. The gas guide 24 forms a gas guide channel in conjunction with the wall element 24.1, the connection sections 24.2 and a bottom wall 24.3. This gas guide channel forms gas outlet openings 25 at its longitudinal ends, which gas outlet openings can be used to establish a gas-conducting connection with the environment. Of course, it is also conceivable that only one gas outlet opening 25 or even several gas outlet openings are provided at other locations.

As FIG. 3 shows, the housing 20 provides a gas-conducting connection from the gas outlet opening(s) 25 through the gas guide channel and through the gas passage openings 27.2 to the interior 21.2 of the emergency degassing device 10.

A gas-tight, in particular air-tight, membrane 30 is provided to block this gas-conducting connection. The gas-tight membrane 30 is preferably designed as an area element and is further preferably formed by a plastic film.

The membrane 30 is largely waterproof, and in particular, the membrane 30 is designed to be sufficiently tear resistant to prevent unintentional failure of the membrane 30 due to the impact of external water pressure.

In particular, the membrane 30 can be a film, to which the support 40 is injected in a mold ("back injection molding"), wherein the membrane 30 and the support 40 are preferably made of a thermoplastic. In this way, a gas-tight connection between the support 40 and the membrane 30 can be established in one single operation.

It is also conceivable that the membrane 30 is inserted into the membrane mount 27 and then back-injection molded using plastic in a mold to form the support 40. This type of back injection molding reduces the number of parts and the assembly costs.

Conceivably, the membrane 30 comprises a polyethylene terephthalate or polycarbonate, preferably it is made entirely of such a material.

The membrane 30 is preferably shaped like of a circular disc, but may have other shapes. However, it has been shown that the circular disc has advantageous properties when deformed.

The membrane 30 has an inner surface 33 facing the interior 21.2 of the housing 20 when assembled. The membrane 30 also has an outer surface 32. In the assembled state, the outer surface 32 faces the exterior 21.1. Furthermore, the membrane 30 has a circumferential connection section 31, which is preferably formed at the rim.

The membrane 30 may be connected either directly, or indirectly via a support 40, to the attachment section 27.5 of the membrane mount 27.

When the membrane 30 is directly attached, it is connected to the attachment section 27.5 by the connection section 31 in a circumferential and gas-tight manner. This can be done, for instance, using an adhesive bond. Conceivable here is bonding or welding, in particular ultrasonic welding or back injection molding.

In the case of indirect attachment, the connection section 31 of the membrane 30 is placed on an attachment surface 44 of the support 40, as shown in FIG. 1. The connection section 31 of the membrane 30 may be used to circumferentially connect it to the attachment surface 44 in a gas-tight manner. It is also conceivable that the connection is established by an adhesive bond, in particular a bond or a weld, in particular an ultrasonic weld.

FIG. 1 furthermore shows that the support 40 comprises a coupling piece 41. This coupling piece 41 has a connection surface 42. Further, the coupling piece 41 supports a membrane support 43 that forms the attachment surface 44. For this purpose, the membrane support 43 holds the attachment surface 44 at a distance from the connection surface 42. The coupling piece 41 may also be described as a radially outwardly extending flange 41.

As FIG. 3 shows, the membrane 30 attached to the support 40 can be inserted headfirst into the membrane mount 27. The connection surface 42, which abuts the attachment section 27.5, limits the insertion motion. A circumferentially gas-tight connection is established between the surfaces of the support 40 and the housing which are in contact there. In addition or alternatively, a circumferential and gas-tight connection can also be established in other places, for instance in the area of the circumferential mount 27.6. The connection can be formed by bonding, welding, in particular ultrasonic welding, or by back injection molding.

FIG. 4 further shows that the housing 20 is provided with a circumferential seal mount 28. This seal mount 28 encompasses the membrane mount 27 on the interior 21.2 of the cover 21. A seal 60 may be inserted, molded or formed into the seal mount 28.

The seals 60 have sealing sections 61, 62. These sealing sections 61, 62 form a circumferential sealing surface 63, as shown in FIG. 1. Furthermore, it is conceivable that the seals 60 can comprise necks 64, which, in the assembled state, circumferentially seal the bores (attachment mounts 22) on the interior 21.2 of the cover. To allow the passage of retaining screws/bolts, the necks 64 may be provided with apertures 65 aligned with the attachment mounts 22.

FIG. 1 further shows that sleeves 50 made of a metal material or plastic are inserted into the attachment mounts 22. Preferably, the sleeves 50 are overmolded with the plastic material of the housing 20 or subsequently pressed in. The sleeves form a bearing surface for a screw head or similar part of an attachment element in the area of the exterior 21.1. On the inside, the sleeves 50 form a contact surface for contacting an exterior of a receiving housing to which the emergency degassing device 10 is to be attached.

FIG. 1 shows that the emergency degassing device 10 includes at least one venting element 74 connected to the housing 20.

The venting element 74 may be designed as a gas-permeable, in particular air-permeable, membrane, in particular film. The film may have channels or pores through which air can pass through the venting element 74 from the exterior 21.1 to the interior 21.2.

The venting element 74 may be attached to the housing 20 in the same manner as the attachment of the gas-tight membrane 30 to the housing 20. In this respect, reference can be made to the above comments on the gas-tight membrane 30. In particular, a holder 70 may be used, which may be of similar or identical design to the support 40.

The holder 70 has a connection piece 71. The connection piece 71 forms a circumferential connection surface 72. A support element 73 is molded to the connection piece 71. The support element 73 has a circumferential coupling surface for the venting element 74.

The venting element 74 has a circumferential connection section 74.3, which is preferably formed circumferentially at the rim. Facing the exterior 21.1 of the housing 20, the venting element 74 forms an exterior 74.1. Facing the interior 21.2 of the housing 20, the venting element 74 forms an interior 74.2.

The connection section 74.3 of the venting element 74 can be placed on the coupling surface of the support element 73 and circumferentially connected thereto, preferably in a gas-tight manner. Reference is made to the above attachment types.

Within the scope of the invention, one or more venting elements 74 may be provided and connected to the housing 20. In this exemplary embodiment, two venting elements 74 are used.

As FIG. 3 shows, the housing 20 has a mount 29 for the venting element 74. The mount 29 may comprise a bottom 29.1 provided with air passages 29.2. Alternatively, the bottom 29.1 may be omitted. The bottom 29.1 is advantageous, however, because the cross-section of the passages 29.2 can then be made particularly small, which is advantageous for reasons of splash water protection.

The mount 29 has a support part 29.3 having a circumferential attachment section 29.4. The attachment section 29.4 merges into a preferably circumferential wall section 29.5.

FIG. 6 shows that in order to mount the venting element 74 to the housing 20, first the venting element 74 is connected to the holder 70. The holder 70 with the venting element 74 is then inserted into the mount 29. The insertion motion can, for instance, be limited by the connection surface 72, which comes to rest circumferentially on the attachment section 29.4. The support element 73 protrudes beyond the attachment section 29.4 in a direction toward the exterior 21.1.

The holder 70 can be attached in the same way as the support 40. In this respect, reference can be made to the above statements.

As FIG. 6 further indicates, the arrangement of the one or more mounts 29 may be such that the air passages 29.2 open into the channel enclosed by the gas guide 24.

FIG. 6 further shows that a free space may be formed in the area between the outer surface 74.1 of the venting element 74 and the bottom 29.1 of the housing 20. Preferably provision is made for a drainage 26 to open into this free space. The end of the drainage 26 facing away from the open space is routed to the environment.

Any water that may have entered can be drained away via the drainages 26 to ensure the functionality of both the membrane 30 and the venting elements of the 74.

The emergency degassing device 10 according to the invention is used to seal an aperture in a wall of a receiving housing in a gas-tight manner. In particular, the receiving housing can be a battery housing, in which accumulators are accommodated. To close the aperture, the emergency degassing device 10 is placed over the aperture on the wall of the receiving housing and connected thereto, for instance with the aid of screw/bolt elements, which are passed through the attachment mounts 22. Of course, it is also possible to establish a different type of connection between the emergency degassing device 10 and the receiving housing. For instance, it is conceivable that the emergency degassing device 10 is provided with integrally formed snap hooks that latch to the wall of the receiving housing. Furthermore, the use of clamped connections is feasible.

The mode of operation of the emergency degassing device 10 is as follows. During normal operation, the membrane 30 closes the path between the gas guide 24 and the interior of the receiving housing in a gas-tight manner. The venting elements 74 can compensate for normal pressure fluctuations between the environment and the interior of the receiving housing. For this purpose, the gas can pass through the venting elements 74 from the interior of the receiving housing into the gas guide 24 and thus into the environment. If the pressure in the receiving housing decreases due to operation, gas can also flow in the opposite direction.

If, in the event of an incident, high pressure is suddenly present in the interior of the receiving housing, the membrane 30 bulges out of the position shown in FIG. 4 towards the exterior 21.1 until it contacts the cutting element 27.3 at an impermissible increase of pressure. The cutting element 27.3 damages the membrane 30, whereupon the tensioned membrane 30 then ruptures. In this way, the gas-conducting connection can be released across a large area. The gas pressure from the interior of the receiving housing is relieved through the gas passage openings 27.5 into the gas guide 25. The gas can then escape into the environment.

In an alternative embodiment of an emergency degassing device 10, a plurality of gas passage openings 27.2 may be provided on the holder 27.1 to provide a gas-conducting connection to the gas guide 24 disposed at the front. This gas guide 24 may then also have, for instance, multiple gas guide channels. At least one gas passage 27.2 is provided for each of these gas guiding channels to establish a gas guiding connection with this gas guiding channel.

Each of the gas guide channels of the gas guide 24 is delimited by a wall element, which is integrally connected to the outside of the housing 20 by connection sections. The connection sections 24.2 hold the wall element 24.1 at a distance from the bottom wall 24.3.

The invention claimed is:

1. An emergency degassing device, comprising:
a housing defining an interior and an exterior, the housing including at least one gas passage opening communicating the interior and the exterior, and the housing including at least one air passage communicating the interior and the exterior;
a gas-tight membrane closing off the gas passage opening;
a gas-permeable membrane covering the air passage to provide a venting element to allow air to vent through the air passage; and
a cutting element supported from the housing at a distance from the gas-tight membrane, the cutting element configured such that upon a predetermined deformation of the gas-tight membrane the cutting element cuts the gas-tight membrane at least at one point to create a flow connection between the interior and the exterior through the gas passage opening;
wherein the housing includes a holder supporting the cutting element, and the housing includes an attachment surface, the holder and the attachment surface being integrally interconnected;
wherein the gas-tight membrane is directly or indirectly connected to the attachment surface in a sealed manner;
wherein the at least one gas passage opening includes first and second gas passage openings; and
wherein the holder has the first and second gas passage openings formed therein and the holder includes a bar section extending between the first and second gas passage openings, the bar section supporting the cutting element.

2. The device of claim 1, wherein:
the housing includes a spacer integrally formed between the holder and the attachment surface and defining a distance between the holder and the attachment surface.

3. The device of claim 1, wherein:
the attachment surface is recessed in a wall of the housing facing the interior.

4. The device of claim 1, wherein:
the housing includes an integrally formed one piece cover having a plurality of bores defined through the cover for receiving fasteners for attaching the emergency degassing device to a battery housing.

5. The device of claim 4, further comprising:
a plurality of sleeves received in the plurality of bores, each of the sleeves being connected to the cover within its respective bore, each of the sleeves providing a bearing surface for one of the fasteners.

6. The device of claim 1, wherein:
the housing includes a cover having a seal mount; and
the device further includes a circumferential seal received by the seal mount and forming a circumferential sealing surface for sealing against a battery housing.

7. The device of claim 1, wherein:
the housing includes an annular recessed attachment surface;
the gas-tight membrane includes a circumferential connection section; and
the device further includes a annular support including an annular circumferential attachment surface, the circumferential connection section of the gas-tight membrane being attached to the annular circumferential attachment surface in a gas-tight manner, the annular support further including a radially outwardly extending coupling flange connected to the annular recessed attachment surface of the housing.

8. The device of claim 1, wherein:
the gas-tight membrane and the gas-permeable membrane each have a free cross-sectional area, and the free cross-sectional area of the gas-permeable membrane is smaller than the free cross-sectional area of the gas-tight membrane.

9. An emergency degassing device, comprising:
a housing defining an interior and an exterior, the housing including at least one gas passage opening communicating the interior and the exterior, and the housing including at least one air passage communicating the interior and the exterior;
a gas-tight membrane closing off the gas passage opening;
a gas-permeable membrane covering the air passage to provide a venting element to allow air to vent through the air passage; and
a cutting element supported from the housing at a distance from the gas-tight membrane, the cutting element configured such that upon a predetermined deformation of the gas-tight membrane the cutting element cuts the gas-tight membrane at least at one point to create a flow connection between the interior and the exterior through the gas passage opening;
wherein the housing includes a gas guide providing a spatial connection between the at least one gas passage opening, the at least one air passage and an environment surrounding the exterior of the housing, the gas guide including at least one wall element covering the at least one gas passage opening and the at least one air passage.

10. The device of claim 9, wherein:
the gas guide includes two connection sections integrally connecting the at least one wall element to the housing, and the at least one wall element and the connection sections delimit at least one gas channel of the gas guide.

11. The device of claim 10, wherein:

the gas passage opening has a minimum cross-sectional dimension; and the gas guide includes at least one gas outlet opening communicating the gas channel with the environment surrounding the exterior of the housing, the gas outlet opening being disposed a distance from the gas passage opening at least twice the minimum cross-sectional dimension of the gas passage opening.

12. The device of claim 10, wherein:

the air passage has a minimum cross-sectional dimension; and the gas guide includes at least one gas outlet opening communicating the gas channel with the environment surrounding the exterior of the housing, the gas outlet opening being disposed a distance from the air passage at least twice the minimum cross-sectional dimension of the air passage.

13. The device of claim 10, wherein:

the gas guide includes at least one gas outlet opening communicating the gas channel with the environment surrounding the exterior of the housing, and there is no straight line of sight between the gas outlet opening and either the gas passage opening or the air passage.

14. The device of claim 10, wherein:

the gas guide includes at least one gas outlet opening communicating the gas channel with the environment surrounding the exterior of the housing, the at least one gas outlet opening having a cross-sectional area greater than a cross-sectional area of the at least one gas passage opening.

15. An emergency degassing device, comprising:

a housing defining an interior and an exterior, the housing including at least one gas passage opening communicating the interior and the exterior, and the housing including at least one air passage communicating the interior and the exterior;

a gas-tight membrane closing off the gas passage opening;

a gas-permeable membrane covering the air passage to provide a venting element to allow air to vent through the air passage; and a cutting element supported from the housing at a distance from the gas-tight membrane, the cutting element configured such that upon a predetermined deformation of the gas-tight membrane the cutting element cuts the gas-tight membrane at least at one point to create a flow connection between the interior and the exterior through the gas passage opening;

wherein the housing includes an annular recessed attachment surface;

wherein the gas-permeable membrane includes a circumferential connection section; and wherein the device further includes a annular support including an annular circumferential attachment surface, the circumferential connection section of the gas-permeable membrane being attached to the annular circumferential attachment surface in a gas-tight manner, the annular support further including a radially outwardly extending coupling flange connected to the annular recessed attachment surface of the housing.

* * * * *